3,116,220
PROCESS FOR THE 9α-HYDROXYLATION OF STEROIDS WITH ASCOCHYTA
Oldrich K. Sebek, Kalamazoo, Mich., assignor to The Upjohn Company, Kalamazoo, Mich., a corporation of Delaware
No Drawing. Filed Apr. 26, 1962, Ser. No. 190,219
12 Claims. (Cl. 195—51)

This invention relates to the microbiological conversion of steroids and more particularly to the introduction of a 9α-hydroxy group into steroids by means of the fungus *Ascochyta linicola*.

The present invention provides an improved process for the preparation of 9α-hydroxy steroids which comprises subjecting a steroid having a hydrogen at the 9-position to the action of an oxygenating strain of the fungus *Ascochyta linicola* or enzymes thereof to produce the corresponding 9α-hydroxy-steroid. Steroids having the 3-keto-$\Delta^4$ structure are especially useful as starting materials for bioconversion to the corresponding 3-keto-$\Delta^4$-9α-hydroxy steroids according to the process of this invention but the process is not limited to compounds having this structure.

Starting materials for the process of this invention are preferably compounds of the androstane and pregnane series having hydrogen at the 9-position which can also contain substituents attached to the ring system at other positions and to the side-chain, such as for example free or esterified hydroxyl groups, free or ketalized oxo groups, lower alkyl groups, e.g., methyl, ethyl, propyl and the like or halogen atoms, and which can also contain one or more double bonds in the ring system and in the side-chain, e.g., 4, 5, 6, 15, 16, 17(20) etc.

Typical starting materials include 21-hydroxyprogesterone, 17-methyltestosterone, 17α,21-dihydroxyprogesterone, progesterone, 17α-hydroxyprogesterone 11-ketoprogesterone, 11a-hydroxyprogesterone, testosterone, cortisone, hydrocortisone, and the like.

The novel process of the present invention is highly specific for the introduction of a 9α-hydroxy group thereby giving 9α-hydroxy steroids which are essentially free from other monohydroxylated products. The 9α-hydroxy steroids of the pregnane series have glucocorticoid and progestational activity. The 9α-hydoxy compounds of the androstane series are useful as antiandrogenic, antiestrogenic and antifertility agents. These 9α-hydroxy steroids are also useful in the preparation of other therapeutically useful steroids. For example, the 9α-hydroxy-11-unsubstituted steroids can be easily dehydrated to the valuable 9(11)-dehydro steroids in accordance with methods known in the art, e.g., with thionyl chloride in the presence of pyridine. The 9(11)-dehydro compounds thus obtained are known intermediates in the production of highly active compounds. For example the 9(11)-dehydro steroids can be easily converted to be corresponding 9α-halo-11β-hydroxy compounds in accordance with procedures known in the art, e.g., U.S. Patent 2,852,511 for the preparation of 9α-halo-hydrocortisone.

The 9α-hydroxy compounds produced by the process of this invention can be prepared and administered to birds and mammals, including humans and valuable domestic animals, in a wide variety of oral or parenteral dosage forms singly, or in admixture with other coacting compounds. They can be associated with a pharmaceutical carrier which can be a solid material, e.g., starch, lactose, talc, calcium stearate, etc., or a liquid, e.g., water, ethanol, mixtures thereof, corn oil, etc., in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions, and the like, with or without coacting antibiotics, germicides or other materials forming advantageous compositions therewith.

In the process of the present invention, the operational conditions, reaction procedure and details are those already known in the art of steroid bioconversion as illustrated by Murray et al. U.S. Patent 2,735,800, utilizing, however, action of the species of fungus *Ascochyta linicola* or the oxidative enzymes thereof. The genus *Ascochyta* belongs to the family Sphaerioidaceae of the order Sphaeropsidales of the class Fungi Imperfecti.

The typical strain preferred for the practice of this invention is *Ascochyta linicola*, available from the U.S. Department of Agriculture, Northern Utilization Research and Development Division, Peoria, Illinois, Collection No. N.R.R.L. 2923. It is to be understod, however, that other strains of *Ascochyta linicola* are suitable for the practice of this invention.

In the practice of this invention, the conversion may be effected in a growing culture of the micro-organisms by either adding the selected steroid starting material to the culture during the incubation period, or including it in the nutrient medium prior to inoculation. Assimilable sources of nitrogen and carbon should be present in the culture medium. Also an adequate sterile air supply should be maintained during the conversion, for example, by the conventional techniques of exposing a large surface of the medium or by passing air through a submerged culture.

Sources of nitrogenous growth promoting factors are those normally employed in such processes. They may be natural organics such as corn steep liquor, soy bean meal, yeast and meat extracts, peptone and/or distillers' solubles, or synthetics such as nitrates and ammonium compounds or combinations thereof.

Suitable energy source materials which may be utilized in the process of this invention include meat extracts and peptone which also serve as nitrogen source or other conventional carbon containing materials such as carbohydrates of the type of glycerol, glucose, fructose, dextrose, sucrose, lactose, maltose, dextrines, starches and whey. These materials may be used either in a purified state or as concentrates such as whey concentrate, corn steep liquor, grain mashes and the like, or as mixtures of the above. The steroids may be added to the culture during the incubation period or included in the medium prior to sterilization or inoculation. The preferred, but not limiting, range of concentration of the steroid in the culture is about 0.1 to 10 grams per liter. The time interval required for the action of the enzymatic system of the micro-organisms employed may vary considerably, the range of about 2 to 96 hours being practical but not limiting; 48 hours being generally satisfactory. The progress of the bioconversion and completion of the bioconversion is conveniently determined by paper strip, vapor phase or thin film chromatography [Textbook, Chromatography, Heftman (1961), Reinhold Publishing Co., New York, New York]. The temperature need be maintained only within such range as supports life, active growth, or the enzyme activity of the fungus. A temperature between about 25 to about 32 degrees centigrade is preferred. The medium can desirably have a pH before inoculation of between about 4 to 8 although a higher or lower pH can be used. A pH of about 4 to 6 is preferred for growth of the fungus.

After completion of the steroid fermentation, the resulting 9α-hydroxy steroid product is recovered from the fermentation reaction mixture by conventional methods.

An especially advantageous manner of recovering the product involves extracting the fermentation reaction mixture, including the fermentation liquor and mycelia, with a water-immiscible organic solvent for steroids, for example, methylene chloride, chloroform, carbon tetrachloride, ethylene chloride, trichloroethylene, ether, amyl acetate, benzene, and the like. The fermentation liquor and mycelia can be first separated by conventional methods, e.g., filtration or centrifugation, and then separately extracted with suitable solvents. The mycelia can be extracted with either water-miscible or water-immiscible solvents, acetone being effective. The fermentation liquor, freed of mycelia, can be extracted with water-immiscible solvents. The extracts can be combined, dried, as for example over anhydrous sodium sulfate, and the purified 9α-hydroxy steroid obtained by recrystallization from organic solvents, by chromatography, or both.

The following examples are illustrative of the process and products of the invention.

EXAMPLE 1

9α,21-Dihydroxyprogesterone

A medium was prepared of 200 g. of cornsteep liquor (60% solids) and 100 g. of commercial dextrose, diluted to 10 l. and adjusted to pH between 4.8 and 5.0; 10 ml. of lard oil was added as an antifoam preventive. This medium was sterilized, inoculated with a 72-hour vegetative growth of Ascochyta linicola (NRRL 2923) and incubated for 48 hours at a temperature of about 28° C. using a rate of aeration of 1 l. per minute at 300 r.p.m. After 48 hours of agitation, a solution of 2.5 g. of 21-hydroxyprogesterone acetate in 20 ml. of dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was triturated with 50 ml. of hot acetone. The mixture was filtered and the filtrate concentrated to about 10 ml. and cooled to give 216 mg. of crystalline 9α,21-dihydroxyprogesterone, M.P. 187–188° C., its infrared spectrum corresponded with that of an authentic specimen. An additional 800 mg. of this product was obtained by chromatography of the mother liquors over synthetic magnesium silicate.

EXAMPLE 2

9α-Hydroxy-17-Methyltestosterone

A medium was prepared of 200 g. of cornsteep liquor (60% solids) and 100 g. of commercial dextrose, diluted to 10 l. and adjusted to pH between 4.8 and 5.0; 10 ml. of lard oil was added as an antifoam preventive. This medium was sterilized, inoculated with a 52-hour vegetative growth of Ascochyta linicola (NRRL 2923) and incubated for 48 hours at a temperature of about 28° C. using a rate of aeration of 0.5 l. per minute at 300 r.p.m. After 48 hours of agitation, a solution of 2.0 g. of 17-methyltestosterone in 15 ml. of dimethylformamide was added to the inoculated medium. After an additional 48-hour period of incubation, the beer and mycelium were separated by filtration. The mycelium was washed with water and the wash-water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was dissolved in about 300 ml. of methylene chloride and poured onto a column of 100 g. of Florisil (synthetic magnesium silicate). The column was developed by eluting with 300 ml. portions (except as otherwise indicated) of solvents and the eluate fractions were evaporated to dryness and the weight of the residue of each fraction determined, as shown in Table I.

TABLE I

| Fraction | Solvent | Weight of residue, mg. |
| --- | --- | --- |
| 1 | Methylene chloride | [1] 1,820 |
| 2 | 5% Acetone in methylene chloride | [1] 890 |
| 3 | 10% Acetone in methylene chloride | [2] |
| 4 | 20% Acetone in methylene chloride | [2] |
| 5 | 50% Acetone in Commercial hexanes (600 ml.) | [2] |

[1] Oily.
[2] Negligible.

Fraction 2 of the chromatogram was crystallized from methanol-ether (1:9) to give 0.335 g. of 9α-hydroxy-17-methyltestosterone having a melting point of 190–191° C.

EXAMPLE 3

9α,17α,21-Trihydroxyprogesterone

A medium was prepared of 2 k. of cornsteep liquor (60% solids) and 1 k. of commercial dextrose, diluted to 100 l. and adjusted to a pH between 4.8 and 5.0; 500 ml. of lard oil was added as an antifoam preventative. This medium was sterilized, inoculated with a 216-hour vegetative growth of Ascochyta linicola (NRRL 2923) and incubated for 43 hours at a temperature of about 28° C. using a rate of aeration of 5 l. per minute at 300 r.p.m. After 43 hours of agitation, a solution of 20 g. of 17α,21-dihydroxyprogesterone in 200 ml. of dimethylformamide was added to the inoculated medium. The substrate was rinsed in with 100 ml. of acetone. After an additional 48-hour period of incubation during which an additional 650 ml. of sterile lard oil antifoam was used, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was dissolved in about 1700 ml. of ethylene dichloride and poured onto a column of 1700 g. of Florisil (synthetic magnesium silicate). The column was developed by eluting with 2500 ml. portions of solvents and the eluate fractions were evaporated to dryness and the weight of the residue of each fraction determined, as shown in Table II.

TABLE II

| Fraction | Solvent | Weight of residue, mg. |
| --- | --- | --- |
| 1 | Ethylene dichloride | 191 |
| 2 | do | 0 |
| 3 | Ethylene dichloride:Acetone (15:1) | 297 |
| 4 | do | 88 |
| 5 | Ethylene dichloride:Acetone (12:1) | 41 |
| 6 | do | 54 |
| 7 | do | 226 |
| 8 | do | 402 |
| 9 | do | 542 |
| 10 | do | 498 |
| 11 | do | 611 |
| 12 | do | 432 |
| 13 | do | 346 |
| 14 | do | 418 |
| 15 | do | 315 |
| 16 | do | 297 |
| 17 | do | 1,257 |
| 18 | do | 980 |
| 19 | do | 691 |
| 20 | Ethylene dichloride:Acetone (1:1) | 858 |
| 21 | do | 726 |
| 22 | do | 603 |

Fractions 17, 18, 19, 20 and 21 of the chromatogram were combined and recrystallized from acetone-ethyl ether to give 2.03 g. of 9α,17α,21-trihydroxyprogesterone having a melting point of 235–240° C.

For purposes of characterization, 250 mg. of 9α,17α, 21-trihydroxyprogesterone was shaken with 4.35 g. of sodium bismuthate in a mixture of 15.5 ml. of chloroform, 3.0 ml. of methanol, 15.5 ml. of ethyl acetate, 17.5 ml. of water, and 0.125 ml. of acetic acid. There was obtained 137 mg. of 9α-hydroxy-4-androstene-3,17-dione, M.P. 218–221°, [α]$_D$+178° (chloroform), $$\lambda_{max.}^{EtOH} \; 241 \; m\mu, \; \epsilon = 14,400$$

EXAMPLE 4

*9α-Hydroxyprogesterone*

A medium was prepared of 2500 g. of cornsteep liquor (60% solids) and 1250 g. of commercial dextrose, diluted to 125 l. and adjusted to a pH between 4.8 and 5. This medium was sterilized, inoculated with a 48-hour vegetative growth of *Ascochyta linicola* (NRRL 2923) and incubated for 48 hours at a temperature of about 28° C. using a rate of aeration of 0.5 l. per minute at 300 r.p.m. After 48 hours of agitation, a solution of 30 g. of progesterone in 200 ml. of dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was dissolved in about 300 ml. of methylene chloride and poured onto a column of 1500 g. of Florisil (synthetic magnesium silicate). The column was developed by eluting with 2200 ml. portions of solvents and the eluate fractions were evaporated to dryness and the weight of the residue of each fraction determined, as shown in Table III.

TABLE III

| Fraction | Solvent | Weight of residue, g. |
| --- | --- | --- |
| 1 | Commercial hexanes | 0.02 |
| 2 | do | 0.03 |
| 3 | 10% Acetone in Commercial hexanes | 0.16 |
| 4 | do | 0.02 |
| 5 | 20% Acetone in Commercial hexanes | 0.16 |
| 6 | do | 5.37 |
| 7 | 25% Acetone in Commercial hexanes | 7.79 |
| 8 | do | 3.30 |
| 9 | do | 3.26 |
| 10 | 30% Acetone in Commercial hexanes | 2.43 |
| 11 | do | 1.51 |
| 12 | do | 1.34 |
| 13 | 40% Acetone in Commercial hexanes | 1.52 |
| 14 | do | 0.75 |
| 15 | 50% Acetone in Commercial hexanes | 0.55 |
| 16 | do | 0.30 |
| 17 | 75% Acetone in Commercial hexanes | 0.26 |
| 18 | do | 0.15 |
| 19 | Acetone | 0.10 |
| 20 | do | 0.06 |

Fractions 6 and 7 of the chromatogram were combined and recrystallized from methanol-ether to give 7.62 g. of 9α-hydroxyprogesterone having a melting point of 191–194° C. The infrared spectrum was the same as that of an authentic sample of 9α-hydroxyprogesterone. An additional 2.20 g. of 9α-hydroxyprogesterone, M.P. 191–193°, was obtained by crystallization from the mother liquors.

EXAMPLE 5

*9α-Hydroxy-4-Androstene-3,17-Dione*

A medium was prepared of 2500 g. of cornsteep liquor (60% solids) and 1250 g. of commercial dextrose, diluted to 125 l. and adjusted to a pH between 4.8 and 5. This medium was sterilized, inoculated with a 72-hour vegetative growth of *Ascochyta linicola* (NRRL 2923) and incubated for 99 hours at a temperature of about 28° C. using a rate of aeration of 0.5 l. per minute at 250 r.p.m. After 99 hours of agitation, a solution of 20 g. of testosterone in 200 ml. of dimethylformamide was added to the inoculated medium. After an additional 48-hour of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts, which were found by paperchromatography to contain 9α-hydroxytestosterone and 9α-hydroxy-4-androstene-3,17-dione in approximately equal quantities, were washed with one-fourth volume of distilled water and the solvent was removed by distillation to give a crude residue which was dissolved in acetone and oxidized with an excess of Jones chromic acid reagent. After dilution with water, the steroidal product was extracted with methylene chloride. Partial evaporation of the methylene chloride solution, followed by trituration with 20% acetone in ether gave 7.55 g. of crude 9α-hydroxy-4-androstene-3,17-dione, M.P. 194–215°. Recrystallization from acetone-ether gave 3.64 g. of 9α-hydroxy-4-androstene-3,17-dione, M.P. 218–220° C. An additional 1.89 g., M.P. 206–215°, was recovered from the mother liquors.

EXAMPLE 6

*9α-Hydroxytestosterone*

When the bioconversion of 15 g. of testosterone was carried out essentially as described in the preceding example, the extract residue, which was found by paperchromatography to contain approximately equal amounts of 9α-hydroxytestosterone and 9α-hydroxy-4-androstene-3,17-dione, was dissolved in about 100 ml. of methylene chloride and poured onto a column of Florisil (synthetic magnesium silicate) 7.2 cm. in diameter and 35 cm. high. The column was developed by eluting with 1 l. portions of solvents and the eluate fractions were evaporated to dryness and the weight of each fraction determined, as shown in Table IV.

TABLE IV

| Fraction | Solvent | Weight of residue, mg. |
| --- | --- | --- |
| 1 | Commercial hexanes | 163 |
| 2 | do | 12 |
| 3 | do | 1 |
| 4 | 5% Acetone in Commercial hexanes | 0 |
| 5 | do | 140 |
| 6 | do | 83 |
| 7 | 10% Acetone in Commercial hexanes | 20 |
| 8 | do | 12 |
| 9 | do | 30 |
| 10 | do | 50 |
| 11 | do | 24 |
| 12 | do | 29 |
| 13 | 25% Acetone in Commercial hexanes | 69 |
| 14 | do | 78 |
| 15 | do | 2,615 |
| 16 | do | 3,063 |
| 17 | do | 1,611 |
| 18 | do | 1,578 |
| 19 | Acetone | 1,121 |
| 20 | do | 5,275 |
| 21 | do | 532 |

Fractions 17 and 18 of the chromatogram were combined and recrystallized from acetone-commercial hexanes to give 2.13 g. of 9α-hydroxytestosterone having a melting point of 194–196° C. The analytical sample, twice recrystallized from the same solvent system, had a melting point of 196–197°, [α]$_D$ +79° (dioxane), $$\lambda_{max.}^{EtOH} \; 243 \; m\mu, \; \epsilon = 14,900$$

Earlier fractions of the chromatogram afforded 9α-hydroxy-4-androstene-3,17-dione.

EXAMPLE 7

*9α-Hydroxy-11-Ketoprogesterone*

A medium was prepared of 200 g. of cornsteep liquor (60% solids) and 100 g. of commercial dextrose, diluted to 10 l. and adjusted to a pH between 4.8 and 5.0, 10 ml. of lard oil was added as an antifoam preventive. This medium was sterilized, inoculated with a 72-hour vegetative growth of *Ascochyta linicola* (NRRL 2923) and incubated for 48 hours at a temperature of about 28° C. using a rate of aeration of 1 l. per minute at 300 r.p.m. After 48 hours of agitation, a solution of 2.5 g. of 11-ketoprogesterone in 20 ml. of dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was triturated with 50 ml. of hot acetone. The mixture was filtered and the filtrate concentrated to about 10 ml. volume and cooled to give 700 mg. of crystalline 9α-hydroxy-11-ketoprogesterone.

EXAMPLE 8

*9α,11β,21-Trihdroxy-4-Pregnene-3,20-Dione*

A medium was prepared of 200 g. of cornsteep liquor (60% solids) and 100 g. of commercial dextrose, diluted to 10 l. and adjusted to a pH between 4.8 and 5.0, 10 ml. of lard oil was added as an antifoam preventive. This medium was sterilized, inoculated with a 72-hour vegetative growth of *Ascochyta linicola* (NRRL 2923) and incubated for 48 hours at a temperature of about 28° C. using a rate of aeration of 1 l. per minute at 300 r.p.m. After 48 hours of agitation, a solution of 2.0 g. of corticosterone in 15 ml. of dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue which was triturated with 50 ml. of hot acetone. The mixture was filtered and the filtrate concentrated to about 10 ml. and cooled to give 200 mg. of crystalilne 9α,11β-21-trihydroxy-4-pregnene-3,20-dione.

We claim:

1. A process for the production of a 9α-hydroxy steroid which comprises subjecting a steroid having a hydrogen at the 9-position selected from the group consisting of the androstane and pregnane series to the action of an oxygenating strain of the fungus *Ascochyta linicola*.

2. A process for the production of a 9α-hydroxy steroid which comprises aerobically contacting a steroid having a hydrogen at the 9-position selected from the group consisting of the androstane and pregnane series to the action of the fungus *Ascochyta linicola*, in an aqueous nutrient medium under submerged fermentation conditions to produce the corresponding 9α-hydroxy steroid.

3. A process for the production of a 9α-hydroxy steroid which comprises aerobically contacting a steroid having a hydrogen at the 9-position selected from the group consisting of the androstane and pregnane series to the action of the fungus *Ascochyta linicola*, in an aqueous nutrient medium under submerged fermentation conditions, continuing the fermentation until a substantial amount of the corresponding 9α-hydroxy steroid is produced and isolating the 9α-hydroxy steroid from the fermentation medium.

4. A process for the production of a 9α-hydroxy-3-keto-$\Delta^4$-steroid which comprises aerobically contacting a 3-keto-$\Delta^4$-steroid having a hydrogen at the 9-position selected from the group consisting of the androstane and pregnane series to the action of the fungus *Ascochyta linicola*, in an aqueous nutrient medium under submerged fermentation conditions to produce the corresponding 9α-hydroxy-3-keto-$\Delta^4$-steroid.

5. A process according to claim 4 for the production of 9α,21-dihydroxyprogesterone, wherein the starting material is 21-hydroxyprogesterone.

6. A process according to claim 4 for the production of 9α-hydroxy-17-methyltestosterone, wherein the starting material is 17-methyltestosterone.

7. A process according to claim 4 for the production of 9α,17α,21-trihydroxyprogesterone, wherein the starting material is 17α,21-dihydroxyprogesterone.

8. A process according to claim 4 for the production of 9α-hydroxyprogesterone, wherein the starting material is progesterone.

9. A process according to claim 4 for the production of 9α-hydroxytestosterone, wherein the starting material is testosterone.

10. A process according to claim 4 for the production of 9α-hydroxy-4-androstene-3,17-dione, wherein the starting material is testosterone.

11. A process according to claim 4 for the production of 9α-hydroxy-11-ketoprogesterone, wherein the starting material is 11-ketoprogesterone.

12. A process according to claim 4 for the production of 9α,11β,21-trihydroxy-4-pregnene-3,20-dione, wherein the starting material is corticosterone.

References Cited in the file of this patent

Prescott et al.: Industrial Microbiology, 3rd ed., McGraw-Hill Book Co., Inc., New York, 1959, pp. 734, 735. (Copy in Div. 63.)